(12) United States Patent
Okabe et al.

(10) Patent No.: US 11,843,120 B2
(45) Date of Patent: Dec. 12, 2023

(54) ELECTRODE, BATTERY, AND METHOD FOR MANUFACTURING ELECTRODE

(71) Applicant: Panasonic Intellectual Property Management Co., Ltd., Osaka (JP)

(72) Inventors: Ami Okabe, Osaka (JP); Shuzo Tsuchida, Nara (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

(21) Appl. No.: 17/402,613

(22) Filed: Aug. 16, 2021

(65) Prior Publication Data
US 2022/0085381 A1 Mar. 17, 2022

(30) Foreign Application Priority Data
Sep. 17, 2020 (JP) .................. 2020-156130

(51) Int. Cl.
*H01M 4/66* (2006.01)
*H01M 4/04* (2006.01)
*H01M 4/36* (2006.01)

(52) U.S. Cl.
CPC ........... *H01M 4/666* (2013.01); *H01M 4/043* (2013.01); *H01M 4/0404* (2013.01); *H01M 4/364* (2013.01)

(58) Field of Classification Search
CPC ..... H01M 4/666; H01M 4/0404; H01M 4/364
See application file for complete search history.

(56) References Cited

U.S. PATENT DOCUMENTS

| 2008/0020283 A1 | 1/2008 | Miyashiro et al. |
| 2018/0337396 A1 | 11/2018 | Kim |
| 2019/0296335 A1 | 9/2019 | Yao |
| 2022/0020987 A1 | 1/2022 | Kim et al. |

FOREIGN PATENT DOCUMENTS

| EP | 3 675 263 | 7/2020 |
| JP | 2006-210003 | 8/2006 |
| JP | 2015-041543 | 3/2015 |

(Continued)

OTHER PUBLICATIONS

Machine Translation of JP-2015041543-A (May 9, 2023) (Year: 2023).*

(Continued)

*Primary Examiner* — Matthew J Merkling
(74) *Attorney, Agent, or Firm* — Wenderoth, Lind & Ponack, L.L.P.

(57) ABSTRACT

An electrode includes a collector, and an active material mixture layer located on the collector and containing first particles, second particles, first active material particles, and second active material particles. The active material mixture layer includes a first mixture layer located on the collector and containing the first particles and the first active material particles, and a second mixture layer located on the first mixture layer and containing the second particles and the second active material particles. The active material mixture layer has a boundary in which the first active material particles and the second active material particles are in contact with each other in a discontinuous state at least in part, in a cross-sectional view of the electrode.

13 Claims, 8 Drawing Sheets

(56) References Cited

FOREIGN PATENT DOCUMENTS

| JP | 2015041543 A | * | 3/2015 |
| JP | 2016-066570 | | 4/2016 |
| JP | 2017-157529 | | 9/2017 |
| KR | 10-2020-0020649 | | 2/2020 |
| KR | 10-213383 | | 7/2020 |
| KR | 10-2133383 | | 7/2020 |

OTHER PUBLICATIONS

Extended European Search Report dated Feb. 2, 2022 in corresponding European Patent Application No. 21188393.9.

* cited by examiner

FIG. 9

(Table 1)

|  | Average value | Minimum value | Maximum value |
|---|---|---|---|
| Thickness($\mu$m) of first positive electrode mixture layer 21 | 190.7 | - | - |
| Particle diameter D($\mu$m) of non-deformed positive electrode active material particles 23B | 4.03 | 3.35 | 5.03 |
| Length B($\mu$m) of entire boundary | 147.0 | - | - |
| Length L($\mu$m) of flat surfaces | 3.90 | 1.81 | 5.98 |
| Ratio $\Sigma$L/B(%) of flat surfaces | 82.3 | - | - |
| Distance d($\mu$m) between deformed positive electrode active material particles 23A | 4.60 | 2.66 | 6.09 |
| d/D(%) | 114.2 | - | - |

ELECTRODE, BATTERY, AND METHOD FOR MANUFACTURING ELECTRODE

BACKGROUND

1. Technical Field

The present disclosure relates to an electrode, a battery, and a method for manufacturing the electrode.

2. Description of the Related Art

In recent years, there has been a demand for the development of rechargeable secondary batteries that can be used repeatedly as electronic devices such as personal computers and mobile phones become light weighted and cordless. Also, in the field of automobiles such as electric vehicles and hybrid vehicles, the development of high-capacity secondary batteries is regarded as important. Examples of the secondary battery include a nickel-cadmium battery, a nickel-hydrogen battery, a lead-acid battery, and a lithium-ion battery. Among these batteries, the demand for lithium-ion batteries having features such as light weight, high voltage, and high energy density is increasing.

The lithium-ion battery contains a positive electrode layer, a negative electrode layer, and an electrolyte disposed therebetween, and as the electrolyte, for example, an electrolytic solution in which a supporting salt such as lithium hexafluorophosphate is dissolved in an organic solvent, or a solid electrolyte is used. Currently, widely used lithium-ion batteries are flammable because an electrolyte containing an organic solvent is used. Therefore, materials, structures and systems are needed to ensure the safety of lithium-ion batteries. On the other hand, by using a nonflammable solid electrolyte as an electrolyte, it is expected that the material, structure and system of the lithium-ion battery can be simplified, and it is considered that the energy density can be increased, the manufacturing cost can be reduced, and the productivity can be improved. Hereinafter, a battery using a solid electrolyte is referred to as an "all-solid-state battery".

In order to increase the capacity of all-solid-state batteries, efforts are being made to increase the density of the active materials contained in the electrode. However, increasing the density of the active materials causes deterioration of battery performance during the charging/discharging process. For example, as the active material particles expand and contract during the charging/discharging process, the contact points between the active material particles decrease, and the conductivity of ions and electrons decreases, and the performance of the battery deteriorates. Further, when the internal stress of the electrode increases due to expansion and contraction, it may cause an internal short circuit due to electrode breakage or buckling, and the electrode performance and safety of the battery deteriorate.

In Japanese Patent Unexamined Publication No. 2006-210003, in order to solve the performance deterioration due to the charging/discharging cycle, an electrode having a stacked structure in which the active material layer of the electrode is stacked and an active material layer having active material particles having different particle diameters in the thickness direction are stacked is disclosed.

SUMMARY

An electrode according to one aspect of the present disclosure includes a collector, and an active material mixture layer that has a first mixture layer located on the collector and containing first particles and first active material particles, and a second mixture layer located on the first mixture layer and containing second particles and second active material particles, in which the active material mixture layer has a boundary in which the first active material particles and the second active material particles are in contact with each other between the first mixture layer and the second mixture layer in a discontinuous state at least in part, in a cross-sectional view of the electrode.

A method for manufacturing an electrode according to another aspect of the present disclosure includes forming a first mixture coating film from a first mixture of first particles and first active material particles on a collector, forming a flat surface by deforming a surface of a part of the first active material particles on a surface portion of the first mixture coating film by pressurizing the first mixture coating film, and forming a second mixture coating film from a second mixture of second particles and second active material particles on the pressurized first mixture coating film.

BRIEF DESCRIPTION OF THE DRAWINGS

FIG. 9 illustrates Table 1 illustrating data measured from the cross-sectional SEM image of the positive electrode active material mixture layer in the examples.

DETAILED DESCRIPTION

Figure 1:
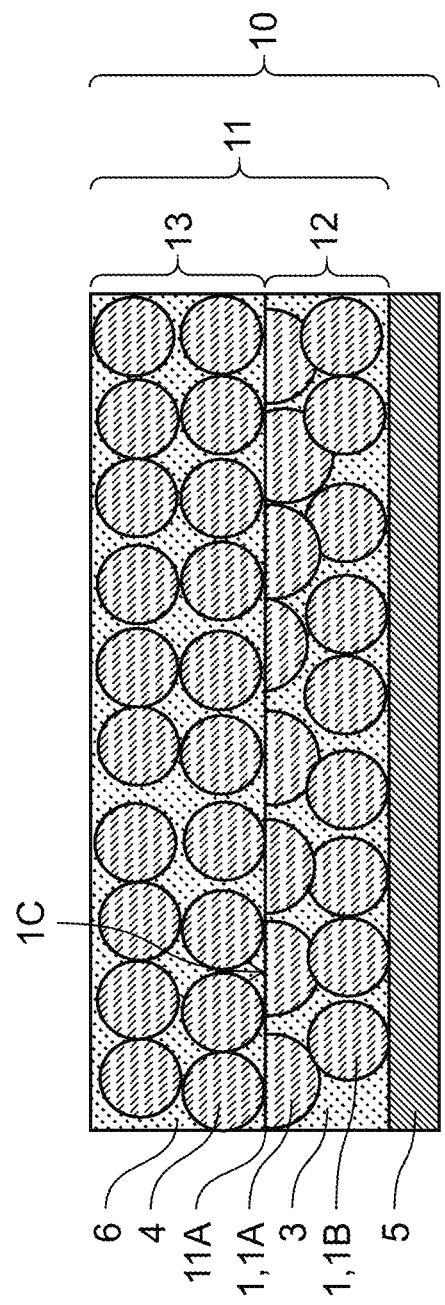
FIG. 1 is a schematic cross-sectional view of an electrode according to an exemplary embodiment.

In the structure of Japanese Patent Unexamined Publication No. 2006-210003, performance deterioration due to uneven expansion and contraction of an active material layer in the thickness direction thereof can be suppressed to some extent, but the expansion and contraction cause displacement of the active material particles and decrease particle contact points. As the number of contact points between active materials decreases, ionic conduction and electron conduction are hindered, and electrode performance deteriorates.

The present disclosure has been made in view of the above problems, and provides an electrode or the like having excellent electrode performance by suppressing deterioration of electrode performance.

SUMMARY OF DISCLOSURE

The outline of one aspect of the present disclosure is as follows.

An electrode according to one aspect of the present disclosure includes a collector, and an active material mixture layer that has a first mixture layer located on the collector and containing first particles and first active material particles, and a second mixture layer located on the first mixture layer and containing second particles and second active material particles, in which the active material mixture layer has a boundary in which the first active material particles and the second active material particles are in contact with each other between the first mixture layer and the second mixture layer in a discontinuous state at least in part, in a cross-sectional view of the electrode.

According to one aspect of the present disclosure, it is possible to provide an electrode or the like having excellent electrode performance. Specifically, there is a contact portion between the first active material particles in the first mixture layer and the second active material particles in the second mixture layer at the boundary. Therefore, even if the first active material particles and the second active material particles move in the first mixture layer and the second mixture layer, respectively, due to expansion and contraction, the first active material particles and the second active material particles exist in separate mixture layers, expansion and contraction are difficult to synchronize, and the contact points between the first active material particles and the second active material particles are likely to be maintained. In addition, since the internal stress due to the expansion and contraction of the first active material particles and the second active material particles can be absorbed at the boundary, the breakage and buckling of the electrode can be suppressed. Therefore, the electrode according to the present aspect has excellent electrode performance and high durability by suppressing deterioration of electrode performance even when charged/discharged or exposed to heat.

Further, for example, the first active material particles may contain deformed particles having a flat surface facing the second mixture layer at the boundary and non-deformed particles having no flat surface.

Since a part of the first mixture layer is in contact with the second mixture layer on the flat surface, the stress due to the expansion and contraction of the first active material particles is dispersed at the boundary between the first mixture layer and the second mixture layer. Therefore, the internal stress due to expansion and contraction generated in the first mixture layer can be efficiently absorbed at the boundary between the first mixture layer and the second mixture layer.

Further, for example, at the boundary, the flat surface of the deformed particles may be in contact with the second active material particles.

As a result, at the boundary, the deformed particles of the first mixture layer and the second active material particles of the second mixture layer are in contact with each other at a surface and a point. Therefore, even if the first active material particles and the second active material particles are slightly moved due to the expansion and contraction of the first active material particles and the second active material particles due to charging and discharging or the like, the contact points between the first active material particles and the second active material particles are likely to be maintained. Therefore, deterioration of electrode performance can be further suppressed.

Further, for example, the deformed particles may contain particles having a length of the flat surface is equal to or larger than an average particle diameter of the non-deformed particles in the cross-sectional view of the electrode.

As a result, the deformed particles have a flat surface having a sufficiently wide area, and therefore expansion and contraction of the first active material particles and the second active material particles occur due to charging and discharging. Even if the first active material particles and the second active material particles are slightly moved, the contact points between the deformed particles contained in the first active material particles and the second active material particles are likely to be maintained.

Further, for example, the deformed particles may contain particles having an angle of 90° or more between the outer circumference of the deformed particles and the flat surface of the deformed particles in the cross-sectional view of the electrode.

As a result, in the cross-sectional view, the width of the deformed particles becomes equal to or greater than the length of the flat surface as the distance from the flat surface increases, and therefore the deformed particles are less likely to be deformed by the stress on the flat surface. Therefore, even if the first active material particles and the second active material particles expand and contract, the contact points between the deformed particles and the second active material particles are likely to be maintained.

Further, for example, an Rz (maximum height) of the flat surface of the deformed particles may be 10 µm or less in the cross-sectional view of the electrode.

As a result, the roughness of the flat surface of the deformed particles is low, and therefore sufficient contact points between the deformed particles and the second active material particles can be easily secured.

Further, for example, the ratio of the total length of the flat surface to the length of the boundary at the boundary may be 80% or more in the cross-sectional view of the electrode.

As a result, the flat surface of the deformed particles exists at 80% or more of the boundary length in the cross-sectional view. Therefore, even if the first active material particles and the second active material particles expand and contract, the contact points between the deformed particles and the second active material particles are likely to be maintained.

Further, for example, an average inter-particle distance between the deformed particles at the boundary may be 130% or less of the average particle diameter of the non-deformed particles.

As a result, as the distance between the deformed particles is narrowed, the contact point between the deformed particles and the second active material particles can be more easily secured. Therefore, even if the first active material particles and the second active material particles expand and contract, the contact points between the deformed particles and the second active material particles are likely to be maintained.

Further, for example, an average particle diameter of the first particles may be 50% or less with respect to the average particle diameter of the non-deformed particles.

As a result, since the first particles can be uniformly adhered to the surface of the first active material particles, even when the first mixture layer is pressurized in the manufacturing of the electrode, excessive stress is less likely to be applied to the first active material particles, and cracking of the first active material particles can be suppressed.

Further, for example, the first particles may be adhered to 80% or more of the surface of the first active material particles in the cross-sectional view of the electrode.

As a result, since 80% or more of the surface of the first active material particles is covered with the first particles, even when the first mixture layer is pressurized in the manufacturing of the electrode, excessive stress is less likely to be applied to the first active material particles, and cracking of first active material particles 1 can be suppressed.

Further, for example, the thickness of the first mixture layer may be within a range of 20 μm or more and 200 μm or less.

When the thickness of the first mixture layer is 20 μm or more, cracking of the first active material particles in the thickness direction can be suppressed when the first mixture layer is pressurized. Further, when the thickness of the first mixture layer is 200 μm or less, the stress between the first active material particles escapes in the plane direction when the first mixture layer is pressurized, therefore preventing the collector from being damaged.

Further, for example, the first particles and the second particles may be solid electrolytes.

As a result, the active material mixture layer contains the solid electrolyte, and the ionic conductivity in the active material mixture layer is improved and the electrode performance is improved.

Further, a battery according to one aspect of the present disclosure includes a positive electrode, a negative electrode, and an electrolyte layer located between the positive electrode and the negative electrode, and at least one of the positive electrode and the negative electrode is the electrode.

As a result, since the battery according to the present aspect includes the above electrode, it is possible to realize a battery having excellent electrode performance.

Further, a method for manufacturing an electrode according to one aspect of the present disclosure includes forming a first mixture coating film from a first mixture of first particles and first active material particles on a collector, forming a flat surface by deforming a surface of a part of the first active material particles on a surface portion of the first mixture coating film by pressurizing the first mixture coating film, and forming a second mixture coating film from a second mixture of second particles and second active material particles on the pressurized first mixture coating film.

As a result, an electrode can be manufactured, on which the first active material particles containing the deformed particles having a flat surface facing the second mixture coating film are formed at the boundary between the first mixture coating film and the second mixture coating film. In such an electrode, the stress due to the expansion and contraction of the first active material particles is dispersed at the boundary and is efficiently absorbed. Therefore, an electrode having excellent electrode performance can be manufactured by the manufacturing method of the present aspect.

Further, by forming a flat surface by deforming the surface of a part of the first active material particles on the surface portion of the first mixture coating film, when the second mixture coating film is formed on the pressurized first mixture coating film, particles in the second mixture coating film can easily flow on the flat surface of the surface of the first mixture coating film, and a uniform second mixture coating film can be formed.

Further, for example, the average particle diameter of the first particles may be 50% or less with respect to an average particle diameter of the first active material particles.

As a result, the first particles can be uniformly adhered to the surface of the first active material particles. Therefore, cracking of the first active material particles can be suppressed when the first mixture coating film is pressurized.

Further, for example, the method for manufacturing the electrode may include preparing the first mixture by mixing the first active material particles and the first particles so that the first particles adhere to 80% or more of the surface of the first active material particles.

As a result, 80% or more of the surface of the first active material particles is covered with the first particles, and therefore cracking of the first active material particles can be suppressed when the first mixture coating film is pressurized.

Further, for example, a pressurized load of the first mixture coating film may be within a range of 100% or more and 300% or less of a one-particle compressive strength of the first active material particles.

By pressurizing the first mixture coating film with a load pressure within such a range, deformed particles can be satisfactorily formed and cracking of the first active material particles can be suppressed. As a result, it is possible to deform the first active material particles to form deformed particles having a flat surface while suppressing cracking of the first active material particles, and further it is possible to prevent the active material particles that are not deformed from being cracked, thereby suppressing the deterioration of the electrode performance.

Hereinafter, the electrode, the battery, and the method for manufacturing the electrode according to the exemplary embodiment of the present disclosure will be described with reference to the drawings. Each drawing is a schematic view and is not necessarily exactly illustrated, and may differ from the actual shape, positional relationship, and ratio. In each drawing, substantially the same configuration is designated by the same reference numerals, and duplicate description may be omitted or simplified.

In addition, the following exemplary embodiments all illustrate specific examples of the present disclosure, and numerical values, shapes, materials, components, disposition positions and connection forms of the components, and the like are merely examples, and the present disclosure is not limited thereto. Further, among the components in the following exemplary embodiments, components not described in the independent claims indicating the highest concept of the present disclosure are described as arbitrary components.

Further, in the present specification, terms indicating relationships between elements such as parallel, terms indicating the shape of elements such as rectangles, and numerical ranges are not expressions that express only strict meanings, but are expressions meaning that a substantially equivalent range, for example, a difference of about several percent is included.

Further, in the present specification, the cross-sectional view is a view illustrating a cross section when the central portion of the electrode or the battery is cut in the stacking direction. Further, in the present specification, the "cross-sectional view" of the electrode means a case where the cross section of the electrode or the central portion of the battery when cut in the stacking direction is viewed from the front.

Further, in the present specification, the terms "upper" and "lower" in the battery configuration do not refer to the upward direction (vertically upward) and the downward direction (vertically downward) in absolute spatial recognition, but are used as terms defined by the relative positional relationship based on the stacked order in the stacking configuration. Further, the terms "top" and "bottom" apply not only when two components are disposed in close contact with each other and the two components are in contact with each other, but also apply when two components are disposed with a space apart from each other and another component exists between the two components.

Exemplary Embodiment

Electrode

An electrode according to the present exemplary embodiment will be described with reference to FIG. 1. FIG. 1 is a schematic cross-sectional view of electrode 10 according to the present exemplary embodiment. In FIG. 1, the region where first particles 3 and second particles 6 exist is illustrated by the region with dots, and the particle shapes of first particles 3 and second particles 6 are not illustrated.

As illustrated in FIG. 1, electrode 10 according to the present exemplary embodiment includes collector 5, and active material mixture layer 11 located on collector 5 and containing first particles 3, second particles 6, first active material particles 1, and second active material particles 4. Active material mixture layer 11 includes first mixture layer 12 located on collector 5 and containing first particles 3 and first active material particles 1, and second mixture layer 13 located on first mixture layer 12 and containing second particles 6 and second active material particles 4. That is, in active material mixture layer 11, first mixture layer 12 and second mixture layer 13 are stacked in this order on collector 5. As illustrated in FIG. 1, in the cross-sectional view of electrode 10, active material mixture layer 11 has boundary 11A in which first active material particles 1 and second active material particles 4 are in contact with each other in a discontinuous state at least in part. First active material particles 1 and second active material particles 4 that are in contact with each other at boundary 11A are not integrated and are not in a continuous state.

Since electrode 10 according to the present exemplary embodiment has such a configuration, at boundary 11A, there is a contact portion between first active material particles 1 in first mixture layer 12 and second active material particles 4 in second mixture layer 13. Therefore, even if first active material particles 1 and second active material particles 4 are moved in first mixture layer 12 and second mixture layer 13, respectively, due to expansion and contraction, first active material particles 1 and second active material particles 4 exist in separate mixture layers, expansion and contraction are difficult to synchronize, and the contact points between first active material particles 1 and second active material particles 4 are likely to be maintained. In addition, since the internal stress due to the expansion and contraction of first active material particles 1 and second active material particles 4 can be absorbed at boundary 11A, the breakage and buckling of electrode 10 can be suppressed. Therefore, electrode 10 according to the present exemplary embodiment has excellent electrode performance and high durability by suppressing deterioration of electrode performance even when charged/discharged or exposed to heat.

Collector 5 is a conductor that exchanges electrons with active material mixture layer 11. The thickness and shape of collector 5 are not particularly limited, and may be appropriately set according to the intended use. The thickness of collector 5 is, for example, within a range of 5 μm or more and 50 μm or less. When the thickness of collector 5 is 5 μm or more, collector 5 is less likely to be damaged, and when the thickness of collector 5 is 50 μm or less, the energy density of the entire battery using electrode 10 can be improved.

The thickness of first mixture layer 12 is, for example, within a range of 20 μm or more and 200 μm or less. When the thickness of first mixture layer 12 is 20 μm or more, cracking of first active material particles 1 in the thickness direction can be suppressed when the first mixture layer 12 is pressurized. Further, when the thickness of first mixture layer 12 is 200 μm or less, the stress between first active material particles 1 escapes in the plane direction when first mixture layer 12 is pressurized, therefore preventing collector 5 from being damaged. The thickness of second mixture layer 13 is not particularly limited and may be appropriately adjusted according to the intended use.

The blending ratio of the components contained in active material mixture layer 11 is not particularly limited. The blending ratio can be appropriately adjusted according to the intended use of electrode 10.

Examples of the shapes of first particles 3 and second particles 6 include a particle shape such as a true spherical shape or an elliptical spherical shape. The average particle diameter ($D_{50}$) of first particles 3 is, for example, 50% or less of the average particle diameter ($D_{50}$) of non-deformed particles 1B described later of first active material particles 1, and may be 2 μm or less. As a result, first particles 3 can be uniformly adhered to the surface of first active material particles 1, and in the manufacturing method described later, when first mixture layer 12 is pressurized, excessive stress is less likely to be applied to first active material particles 1, and cracking of first active material particles 1 can be suppressed. Further, the filling rate in active material mixture layer 11 can be improved. The average particle diameter ($D_{50}$) of first particles 3 may be 0.01 μm or more, or 0.1 μm or more. In the present specification, the average particle diameter ($D_{50}$) may be measured by, for example, a particle size distribution meter, or may be a volume-based average particle diameter measured by a laser analysis and a scattering type particle size distribution measuring device. Further, the average particle diameter ($D_{50}$) may be the average particle diameter measured from a cross-sectional scanning electron microscope (SEM) image of electrode 10.

The average particle diameter ($D_{50}$) of second particles 6 is, for example, 50% or less with respect to the average particle diameter ($D_{50}$) of second active material particles 4, and may be 2 μm or less. As a result, second particles 6 can be uniformly adhered to the surface of second active material particles 4, and in the manufacturing method described later, when second mixture layer 13 is pressurized, excessive stress is less likely to be applied to second active material particles 4, and cracking of second active material particles 4 can be suppressed. Further, the filling rate in active material mixture layer 11 can be improved. The average particle diameter ($D_{50}$) of second particles 6 may be 0.01 μm or more, or 0.1 μm or more. The average particle diameter ($D_{50}$) of first particles 3 and the average particle diameter ($D_{50}$) of second particles 6 may be the same or different.

First particles 3 and second particles 6 are, for example, solid electrolytes. Thereby, the ionic conductivity in active material mixture layer 11 can be improved. The materials of first particles 3 and second particles 6 are not particularly limited and may be selected according to the intended use of electrode 10. For first particles 3 and second particles 6, for example, the same material is used. Different materials may be used for first particles 3 and second particles 6.

Further, for example, first particles 3 are adhered to 80% or more of the surface of first active material particles 1 in the cross-sectional view of electrode 10. As a result, 80% or more of the surface of first active material particles 1 is covered with first particles 3, in the manufacturing method described later, cracking of first active material particles 1 can be suppressed when first mixture layer 12 is pressurized.

The materials of first active material particles 1 and second active material particles 4 are not particularly limited and may be selected according to the intended use of electrode 10. Electrode 10 according to the present exemplary embodiment can be applied to both a positive electrode and a negative electrode. For example, when used as a positive electrode, a material that acts as a positive electrode may be used as the material for collector 5 and active material mixture layer 11. Further, in electrode 10, for example, when used as a negative electrode, a material that acts as a negative electrode may be used as the material of collector 5 and active material mixture layer 11. When electrode 10 is a positive electrode, for example, collector 5 is a positive electrode collector, and active material mixture layer 11 is a positive electrode active material mixture layer containing positive electrode active material particles as first active material particles 1 and second active material particles 4. When electrode 10 is a negative electrode, for example, collector 5 is a negative electrode collector, and active material mixture layer 11 is a negative electrode active material mixture layer containing negative electrode active material particles as first active material particles 1 and second active material particles 4.

First active material particles 1 and second active material particles 4 are, for example, in the form of particles. The average particle diameter ($D_{50}$) of first active material particles 1 and second active material particles 4 is, for example, within a range of 50 nm or more and 50 μm or less, and may be within a range of 1 μm or more and 15 μm or less, respectively. When the average particle diameter ($D_{50}$) of first active material particles 1 and second active material particles 4 is 50 nm or more, the handleability is improved. Further, when the average particle diameter ($D_{50}$) of first active material particles 1 and second active material particles 4 is 50 μm or less, electrode 10 can be easily formed flat. The average particle diameter ($D_{50}$) of first active material particles 1 and the average particle diameter ($D_{50}$) of second active material particles 4 may be the same or different.

The content of first active material particles 1 in first mixture layer 12 and the content of second active material particles 4 in second mixture layer 13 are not particularly limited, but for example, may be within a range of 40% by weight or more and 99% by weight or less, and may be 70% by weight or more and 95% by weight or less. The content of first active material particles 1 in first mixture layer 12 and the content of second active material particles 4 in second mixture layer 13 may be the same or different.

The one-particle compressive strength of first active material particles 1 is, for example, 100 MPa or more. As a result, in the manufacturing method described later, cracking of first active material particles 1 can be suppressed during pressurization. In the present specification, the one-particle compressive strength is the stress when one particle is compressed and the one particle is broken.

Further, as illustrated in FIG. 1, first active material particles 1 contains, for example, deformed particles 1A having flat surface 1C facing second mixture layer 13 at boundary 11A, and non-deformed particles 1B having no flat surface 1C. Further, for example, at boundary 11A, flat surface 1C of deformed particles 1A is in contact with second active material particles 4. As a result, at boundary 11A, deformed particles 1A of first mixture layer 12 and second active material particles 4 of second mixture layer 13 are in contact with each other at a surface and a point as illustrated in FIG. 1. Therefore, even if first active material particles 1 and second active material particles 4 are slightly moved due to the expansion and contraction of first active material particles 1 and second active material particles 4 by charging and discharging or the like, the contact points between first active material particles 1 and second active material particles 4 are likely to be maintained. Since a part of first mixture layer 12 is in contact with second mixture layer 13 on flat surface 1C, the stress due to the expansion and contraction of first active material particles 1 is dispersed at boundary 11A between first mixture layer 12 and second mixture layer 13. Therefore, the internal stress due to expansion and contraction generated in first mixture layer 12 can be efficiently absorbed at boundary 11A.

Deformed particles 1A contain, for example, particles having a length of flat surface 1C is equal to or larger than the average particle diameter ($D_{50}$) of non-deformed particles 1B in the cross-sectional view of electrode 10. As a result, deformed particles 1A have flat surface 1C having a sufficiently wide area, and therefore expansion and contraction of first active material particles 1 and second active material particles 4 occur due to charging and discharging. Even if first active material particles 1 and second active material particles 4 are slightly moved, the contact points between deformed particles 1A contained in first active material particles 1 and second active material particles 4 are likely to be maintained.

Further, deformed particles 1A contain, for example, particles having an angle of 90° or more between the outer circumference of deformed particles 1A and flat surface 1C of deformed particles 1A in the cross-sectional view of electrode 10. As a result, in the cross-sectional view, the width of deformed particles 1A becomes equal to or greater than the length of the flat surface as the distance from flat surface 1C increases, and therefore deformed particles 1A are less likely to be deformed by the stress on flat surface 1C. Therefore, even if first active material particles 1 and second active material particles 4 expand and contract, the contact points between deformed particles 1A and second active material particles 4 are likely to be maintained.

Further, deformed particles 1A contain, for example, a particle of which the surface in contact with boundary 11A has an R shape of 10 times or more the average particle diameter ($D_{50}$) of non-deformed particles 1B in the cross-sectional view of electrode 10. As a result, even if first active material particles 1 and second active material particles 4 are slightly moved by charging/discharging, the contact points between deformed particles 1A and second active material particles 4 are likely to be maintained.

Further, for example, the ratio of the total length of flat surface 1C to the length of boundary 11A at boundary 11A is 80% or more in the cross-sectional view of electrode 10. As a result, flat surface 1C of deformed particles 1A exists at 80% or more of the length of boundary 11A in the cross-sectional view. Therefore, even if first active material particles 1 and second active material particles 4 expand and contract, the contact points between deformed particles 1A and second active material particles 4 are likely to be maintained.

Further, the average inter-particle distance between deformed particles 1A at boundary 11A is, for example, 130% or less of the average particle diameter ($D_{50}$) of non-deformed particles 1B in the cross-sectional view of electrode 10. As a result, as the distance between deformed particles 1A is narrowed, the contact point between deformed particles 1A and second active material particles 4 can be more easily secured. Therefore, even if first active material particles 1 and second active material particles 4 expand and contract, the contact points between deformed particles 1A and second active material particles 4 are likely to be maintained.

Further, the Rz (maximum height) of flat surface 1C of deformed particles 1A is, for example, 10 (μm) or less in the cross-sectional view of electrode 10. As a result, the roughness of flat surface 1C of deformed particles 1A is low, and therefore sufficient contact points between deformed particles 1A and second active material particles 4 can be easily secured.

Further, the Rz of boundary 11A in active material mixture layer 11 is, for example, 10 μm or less. As a result, the internal stress due to the expansion and contraction of first active material particles 1 and second active material particles 4 can be absorbed at boundary 11A.

In the present specification, the active material particles of electrode, mixture layer, and the terms "first" and "second" adhered to the mixture coating film prepared in the manufacturing method do not limit the mixture layer to only two layers, and the mixture layer may be a stack of three or more layers. For example, active material mixture layer 11 may include two or more layers of first mixture layer 12 and one layer of second mixture layer 13, and active material mixture layer 11 may include one layer of first mixture layer 12 and two or more layers of second mixture layer 13. Further, active material mixture layer 11 may have two or more layers of first mixture layer 12 and two or more layers of second mixture layer 13. In this way, when active material mixture layer 11 has three or more layers, the stacked order of the layers is not particularly limited, but for example, second mixture layer 13 is disposed as the layer farthest from collector 5.

Next, an example in which electrode 10 is used as a positive electrode for an all-solid-state battery will be described.

Figure 2:
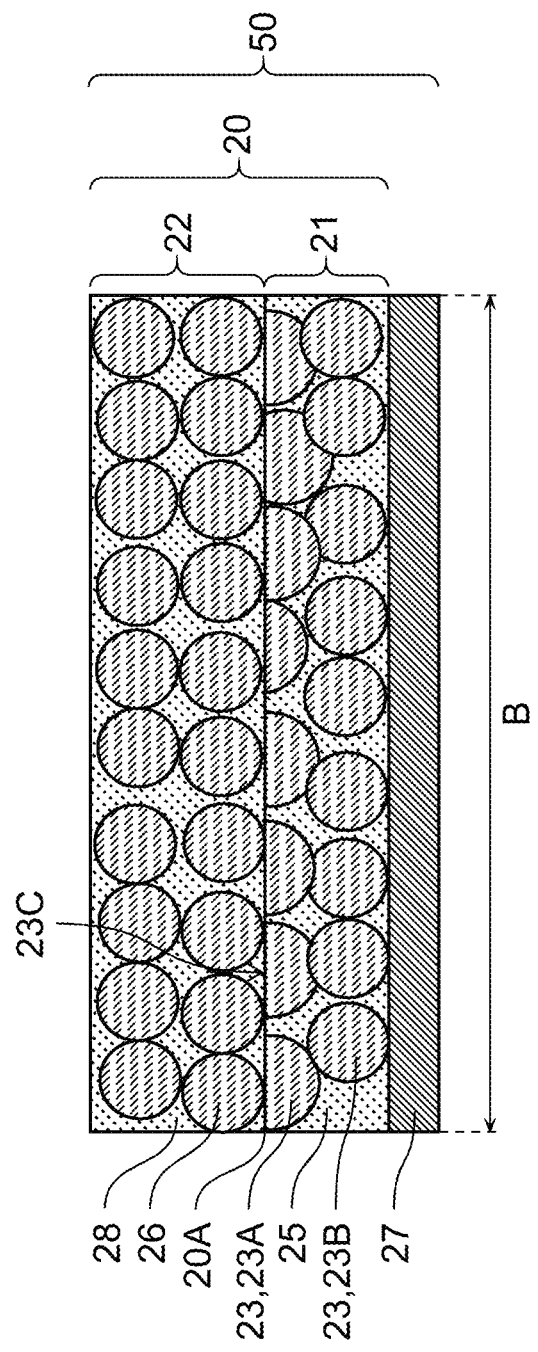
FIG. 2 is a schematic cross-sectional view of a positive electrode according to the exemplary embodiment.

FIG. 2 is a schematic cross-sectional view of positive electrode 50 according to the present exemplary embodiment. In FIG. 2, the region where solid electrolyte 25 and solid electrolyte 28 exist is illustrated by the region with dots, and the particle shapes of solid electrolyte 25 and solid electrolyte 28 are not illustrated. This also applies to FIGS. 3, 4, and 5 below.

As illustrated in FIG. 2, positive electrode 50 according to the present exemplary embodiment includes positive electrode collector 27, and positive electrode active material mixture layer 20 including first positive electrode mixture layer 21 located on positive electrode collector 27 and containing solid electrolyte 25 and first positive electrode active material particles 23 and second positive electrode mixture layer 22 located on first positive electrode mixture layer 21 and containing solid electrolyte 28 and second positive electrode active material particles 26. Further, positive electrode active material mixture layer 20 has boundary 20A in which first positive electrode active material particles 23 and second positive electrode active material particles 26 are in contact with each other in a discontinuous state at least in part in the cross-sectional view of positive electrode 50. Positive electrode 50 is, for example, a positive electrode for an all-solid-state battery.

Positive electrode 50 in the present exemplary embodiment includes positive electrode collector 27 as an example of collector 5. Positive electrode collector 27 may be, for example, metal foil. Positive electrode collector 27 includes, for example, a foil-like body, a plate-like body, or a mesh-like body made of aluminum, gold, platinum, zinc, copper, SUS, nickel, tin, titanium, or an alloy of two or more thereof.

The thickness and shape of positive electrode collector 27 are not particularly limited and may be appropriately set according to the intended use. The thickness of positive electrode collector 27 may be the thickness of collector 5 described above.

In the present exemplary embodiment, positive electrode 50 includes positive electrode active material mixture layer 20 located on positive electrode collector 27 as an example of active material mixture layer 11. Positive electrode active material mixture layer 20 includes first positive electrode mixture layer 21 as an example of first mixture layer 12, and second positive electrode mixture layer 22 as an example of second mixture layer 13. Positive electrode active material mixture layer 20 is a stacked body in which first positive electrode mixture layer 21 and second positive electrode mixture layer 22 are stacked on positive electrode collector 27. First positive electrode mixture layer 21 contains solid electrolyte 25 as an example of first particles 3, and first positive electrode active material particles 23 as an example of first active material particles 1. Further, second positive electrode mixture layer 22 contains solid electrolyte 28 as an example of second particles 6, and second positive electrode active material particles 26 as an example of second active material particles 4.

The thickness of first positive electrode mixture layer 21 is, for example, within a range of 20 μm or more and 200 μm or less, similarly to the above-mentioned first mixture layer 12. The thickness of the second positive electrode mixture layer 22 is not particularly limited and may be appropriately adjusted according to the intended use.

The blending ratio of the components contained in positive electrode active material mixture layer 20 is not particularly limited. The blending ratio can be appropriately adjusted according to the use of positive electrode 50.

Solid electrolyte 25 and solid electrolyte 28 may be appropriately selected depending on the kind of conduction ion (for example, lithium-ion), and for example, at least one of a sulfide-based solid electrolyte and an oxide-based solid electrolyte may be used.

Examples of the sulfide-based solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, and the like. When a sulfide-based solid electrolyte is used as solid electrolyte 25, a sulfide-based solid electrolyte containing Li (lithium), P (phosphorus), and S (sulfur) may be used because of excellent lithium-ion conductivity. As the sulfide-based solid electrolyte, one kind of sulfide-based solid electrolyte may be used alone, or two or more kinds of sulfide-based solid electrolytes may be used in combination. Further, the sulfide-based solid electrolyte may be crystalline, amorphous, or glass-ceramic. The above description of "$Li_2S$—$P_2S_5$" means a sulfide-based solid electrolyte containing $Li_2S$ and $P_2S_5$, and the same applies to other descriptions.

The sulfide-based solid electrolyte is, for example, a sulfide glass ceramic containing $Li_2S$ and $P_2S_5$, and when the ratio of $Li_2S$ and $P_2S_5$ is $Li_2S/P_2S_5$=molar ratio in terms of molars, the molar ratio is preferably within a range of 2.3 or more and 4 or less, and more preferably the molar ratio is in the range of 3 or more and 4 or less. When the molar ratio is in this range, a crystal structure having high ionic conductivity can be obtained while maintaining the lithium concentration that affects the battery characteristics. In addition, a sufficient amount of $P_2S_5$ for reacting with and binding to the binder described later can be secured.

Examples of the oxide-based solid electrolyte include LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}Ti_{0.74}$, $Li_{1.5}Al_{0.5}Ge_{1.5}(PO_4)_3$, and the like. As the oxide-based solid electrolyte, one kind of oxide-based solid electrolyte may be used alone, or two or more kinds of oxide-based solid electrolytes may be used in combination.

The shapes and average particle diameters ($D_{50}$) of solid electrolyte 25 and solid electrolyte 28 may be, for example, the shapes and average particle diameters ($D_{50}$) of first particles 3 and second particles 6 described above.

Further, similarly to the above-mentioned first active material particles 1, for example, solid electrolyte 25 is adhered to 80% or more of the surface of first positive electrode active material particles 23 in the cross-sectional view of positive electrode 50.

First positive electrode active material particles 23 and second positive electrode active material particles 26 may be substances in which lithium (Li) is inserted or removed from the crystal structure at a potential higher than that of the negative electrode, and oxidation or reduction is performed accordingly. The types of first positive electrode active material particles 23 and second positive electrode active material particles 26 are not particularly limited and may be appropriately selected according to the intended use of positive electrode 50. Examples of first positive electrode active material particle 23 and second positive electrode active material particle 26 include an oxide active material, a sulfide active material, and the like. The same substance may be used or different substances may be used as first positive electrode active material particles 23 and second positive electrode active material particles 26.

In the present exemplary embodiment, for example, an oxide active material (lithium-containing transition metal oxide) is used as first positive electrode active material particles 23 and second positive electrode active material particles 26. Examples of the oxide active material include $LiCoO_2$, $LiNiO_2$, $LiMn_2O_4$, $LiCoPO_4$, $LiNiPO_4$, $LiFePO_4$, $LiMnPO_4$, compounds obtained by substituting the transition metals of these compounds with one or more different elements, and the like. Examples of the compound obtained by substituting the transition metal of the above compound with one or more different elements include $LiNi_{1/3}Co_{1/3}Mn_{1/3}O_2$, $LiNi_{0.8}Co_{0.15}Al_{0.05}O_2$, $LiNi_{0.5}Mn_{1.5}O_2$, and the like.

The content of first positive electrode active material particles 23 in first positive electrode mixture layer 21 and the content of second positive electrode active material particles 26 in second positive electrode mixture layer 22 may be the content of first active material particles 1 in first mixture layer 12 and the content of second active material particles 4 in second mixture layer 13 described above.

The surfaces of first positive electrode active material particles 23 and second positive electrode active material particles 26 may be coated with a coat layer. Thereby, the reaction between first positive electrode active material particles 23 and second positive electrode active material particles 26 (for example, oxide active material) and solid electrolyte 25 (for example, a sulfide-based solid electrolyte) can be suppressed. Examples of the material of the coat layer include lithium-ion conductive oxides such as $LiNbO_3$, $Li_3PO_4$, and LiPON. The average thickness of the coat layer is, for example, in the range of 1 nm or more and 20 nm or less, and may be within a range of 1 nm or more and 10 nm or less.

The ratio of first positive electrode active material particles 23 to solid electrolyte 25 and the ratio of second positive electrode active material particles 26 to solid electrolyte 28 contained in positive electrode active material mixture layer 20 are, for example, each within a range of 0.67 or more and 99 or less when the positive electrode active material/solid electrolyte=weight ratio in terms of weight, and may be within a range of 2.3 or more and 19 or less. When the weight ratio is in this range, both the lithium-ion conduction path and the electron conduction path in positive electrode active material mixture layer 20 can be secured. The weight ratios of first positive electrode mixture layer 21 and second positive electrode mixture layer 22 may be the same or different from each other.

Positive electrode active material mixture layer 20 according to the present exemplary embodiment may contain a binder. As a result, the adhesion strength between the materials in positive electrode active material mixture layer 20 can be improved.

Examples of the binder include synthetic rubber such as butadiene rubber, isoprene rubber, styrene-butadiene rubber (SBR), styrene-butadiene-styrene (SBS), styrene-ethylene-butadiene-styrene (SEBS), ethylene-propylene, butyl rubber, chloroprene rubber, acrylonitrile-butadiene rubber, acrylic rubber, silicone rubber, fluororubber, and urethane rubber, and polyvinylidene fluoride (PVDF), polyvinylidene fluoride-hexafluoropropylene copolymer (PVDF-HFP), polyimide, polyamide, polyamide-imide, polyvinyl alcohol, chlorinated polyethylene (CM), and the like.

Positive electrode active material mixture layer 20 may contain a conductive auxiliary agent. As a result, the electron conductivity in positive electrode active material mixture layer 20 can be increased, and therefore the electron conduction path in positive electrode active material mixture layer 20 can be secured, and the internal resistance of the all-solid-state battery using positive electrode 50 can be reduced. Therefore, the amount of current that can be conducted through the electron conduction path increases, and the charging/discharging characteristics of all-solid-state battery are improved.

The conductive auxiliary agent is not particularly limited as long as the agent improves the electron conductivity of positive electrode active material mixture layer 20. As the conductive auxiliary agent, for example, acetylene black, KETJENBLACK (registered trademark), carbon black, graphite, carbon fiber, and the like can be used. As the conductive auxiliary agent, one kind of conductive auxiliary agent may be used alone, or two or more kinds of conductive auxiliary agents may be used in combination.

The shapes and average particle diameters ($D_{50}$) of first positive electrode active material particles 23 and second positive electrode active material particles 26 may be, for example, the shapes and average particle diameters ($D_{50}$) of first active material particles 1 and second active material particles 4 described above.

The one-particle compressive strength of first positive electrode active material particles 23 is, for example, 100 MPa or more, similarly to the above-mentioned first active material particles 1. As a result, in the manufacturing method described later, cracking of first positive electrode active material particles 23 can be suppressed during pressurization.

In positive electrode 50 according to the present exemplary embodiment, first positive electrode active material particles 23 contain, for example, deformed positive electrode active material particles 23A having flat surface 23C facing second positive electrode mixture layer 22 at boundary 20A, and non-deformed positive electrode active material particles 23B having no flat surface 23C. Deformed positive electrode active material particle 23A is an example of deformed particle 1A, and non-deformed positive electrode active material particle 23B is an example of non-deformed particle 1B.

Figure 3:
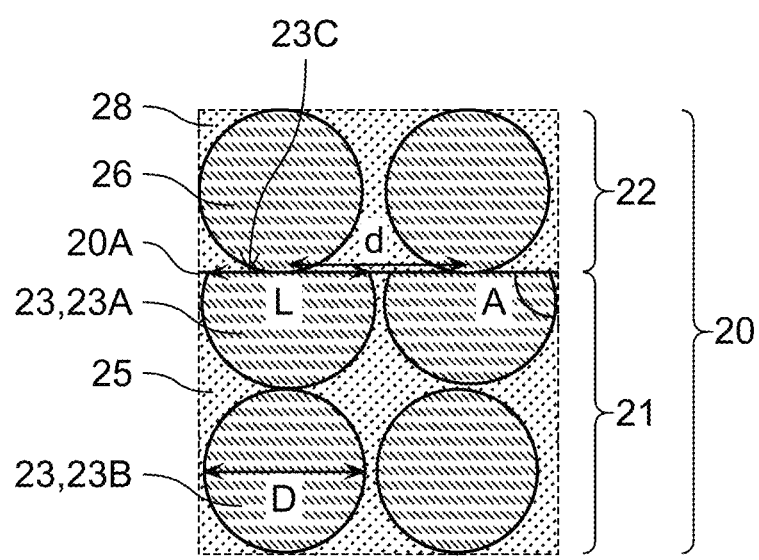
FIG. 3 is an enlarged cross-sectional view illustrating the vicinity of a boundary between a first positive electrode mixture layer and a second positive electrode mixture layer according to the exemplary embodiment.

FIG. 3 is an enlarged cross-sectional view illustrating the vicinity of boundary 20A between first positive electrode mixture layer 21 and second positive electrode mixture layer 22. As illustrated in FIG. 3, in positive electrode 50 according to the present exemplary embodiment, at boundary 20A of the cross section of positive electrode active material mixture layer 20, deformed positive electrode active material particles 23A in first positive electrode mixture layer 21 are in contact with second positive electrode active material particles 26 on flat surface 23C of the particles.

Similar to the above-mentioned deformed particles 1A, deformed positive electrode active material particles 23A contain, for example, particles in which length L of flat surface 23C is equal to or larger than average particle diameter D of non-deformed positive electrode active material particles 23B in the cross-sectional view of positive electrode 50. In other words, for at least some of the particles of deformed positive electrode active material particles 23A, length L of flat surface 23C in the cross-sectional view of positive electrode 50 is equal to or larger than the average particle diameter D ($D_{50}$) of non-deformed positive electrode active material particles 23B.

Further, similarly to the above-mentioned deformed particles 1A, deformed positive electrode active material particles 23A contain particles having angle A of 90° or more between the outer circumference of deformed positive electrode active material particles 23A and flat surface 23C of deformed positive electrode active material particles 23A in the cross-sectional view of positive electrode 50. In other words, at least a part of deformed positive electrode active material particles 23A in first positive electrode mixture layer 21 has angle A of 90° or more between the outer circumference of deformed positive electrode active material particles 23A and flat surface 23C of deformed positive electrode active material particles 23A.

Further, similarly to the above-mentioned deformed particles 1A, deformed positive electrode active material particles 23A contain, for example, particles having an R shape of which a surface in contact with boundary 20A is 10 times or more average particle diameter D ($D_{50}$) of non-deformed positive electrode active material particles 23B in the cross-sectional view of positive electrode 50. In other words, at least a part of the deformed positive electrode active material particles 23A has an R shape of which a surface in contact with boundary 20A is 10 times or more average particle diameter D ($D_{50}$) of non-deformed positive electrode active material particles 23B.

Further, for example, similarly to the above-mentioned boundary 11A, the ratio of the total length of flat surface 23C to length B of boundary 20A at boundary 20A is 80% or more.

Further, similarly to the above-mentioned deformed particles 1A, average inter-particle distance d between deformed positive electrode active material particles 23A at boundary 20A is, for example, 130% or less of average particle diameter D ($D_{50}$) of non-deformed positive electrode active material particles 23B in the cross-sectional view of positive electrode 50. Average inter-particle distance d between deformed positive electrode active material particles 23A is an average value of the distances between the centers of adjacent deformed positive electrode active material particles 23A on flat surface 23C.

Further, the Rz of flat surface 23C of deformed positive electrode active material particles 23A is, for example, 10 μm or less, similarly to the above-mentioned deformed particles 1A in the cross-sectional view of the positive electrode 50.

Further, similarly to the above-mentioned active material mixture layer 11, the Rz of boundary 20A in positive electrode active material mixture layer 20 is, for example, 10 μm or less.

With such positive electrode 50, the same effect as that of electrode 10 described above can be obtained.

Battery

Next, a battery according to the present exemplary embodiment will be described. In electrode 10 according to the present exemplary embodiment, for example, the positive electrode, the electrolyte layer, and the negative electrode are stacked in this order and used as at least one of the positive electrode and the negative electrode of the battery. In the battery according to the present exemplary embodiment, electrode 10 may be used as the positive electrode, electrode 10 may be used as the negative electrode, and electrode 10 may be used for both the positive electrode and the negative electrode.

Figure 4:
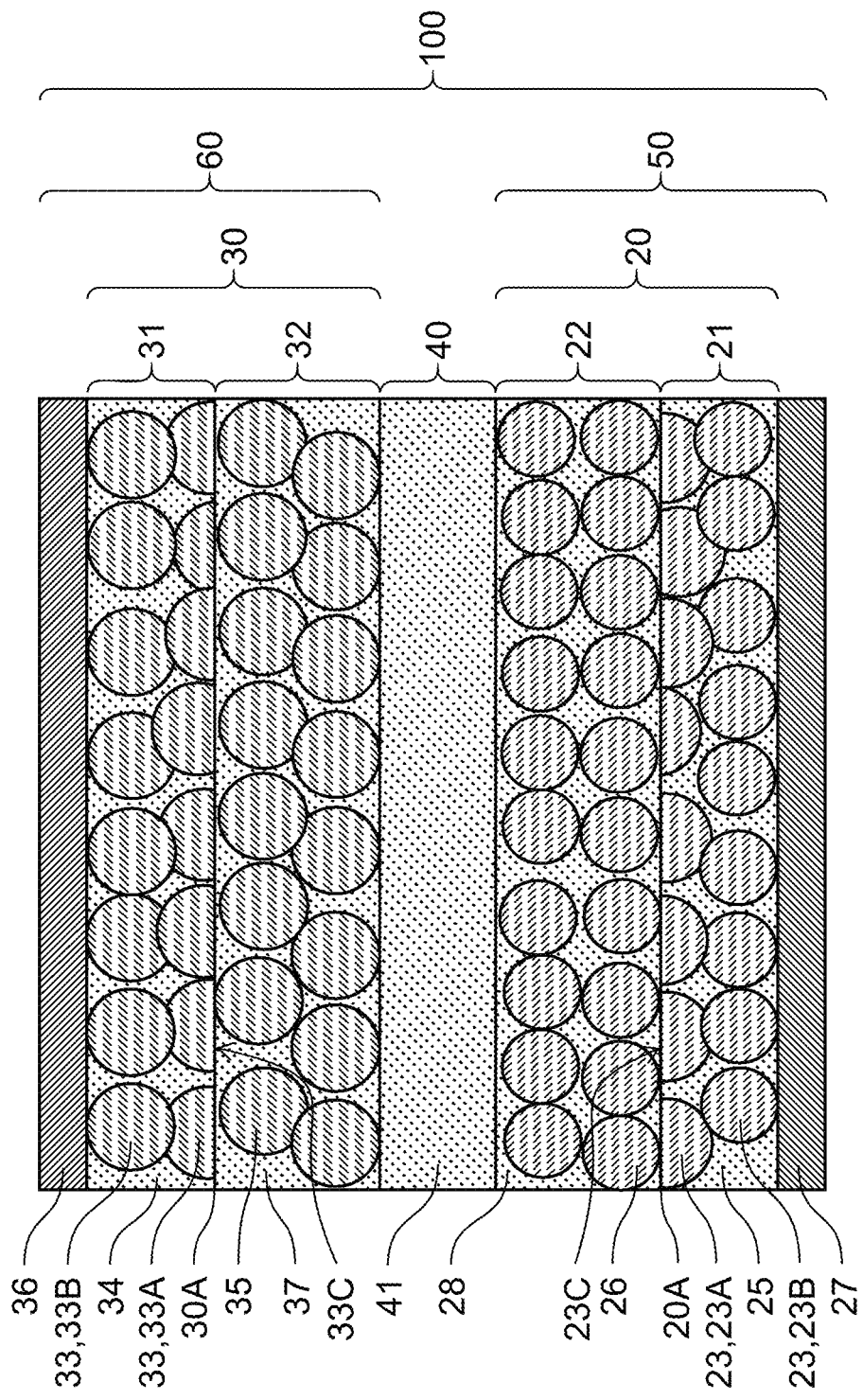
FIG. 4 is a schematic cross-sectional view of an all-solid-state battery according to the exemplary embodiment.

In the present exemplary embodiment, all-solid-state battery 100, which is an example of a battery using positive electrode 50 and negative electrode 60 as electrodes 10, will be described with reference to FIG. 4. FIG. 4 is a schematic cross-sectional view of all-solid-state battery 100. In FIG. 4, the region where solid electrolyte 34, solid electrolyte 37, and solid electrolyte 41 exist is illustrated by the region with dots, and the particle shapes of solid electrolyte 34, solid electrolyte 37, and solid electrolyte 41 are not illustrated.

The battery according to the present exemplary embodiment is not limited to all-solid-state battery 100, and may be a battery having another configuration as long as the battery is a battery using electrode 10.

As illustrated in FIG. 4, all-solid-state battery 100 includes positive electrode 50, negative electrode 60, and solid electrolyte layer 40 located between positive electrode 50 and negative electrode 60. In all-solid-state battery 100, positive electrode 50, solid electrolyte layer 40, and negative electrode 60 are stacked in this order. In all-solid-state battery 100, positive electrode 50 and negative electrode 60 are used as an example of electrode 10. Solid electrolyte layer 40 is an example of the electrolyte layer. The unit structure of positive electrode 50, solid electrolyte layer 40, and negative electrode 60 is illustrated in FIG. 4, but the battery according to the present exemplary embodiment may be an all-solid-state battery in which a plurality of unit structures are stacked. Further, in all-solid-state battery 100 according to the present exemplary embodiment, electrode 10 according to the present exemplary embodiment is used as positive electrode 50 and negative electrode 60, but electrode 10 may be used for at least one of positive electrode 50 and negative electrode 60.

Since positive electrode 50 in all-solid-state battery 100 according to the present exemplary embodiment is the same as that described above, the description thereof will be omitted.

Negative electrode 60 in all-solid-state battery 100 according to the present exemplary embodiment has, for example, negative electrode active material mixture layer 30 including negative electrode collector 36 made of metal foil or the like, first negative electrode mixture layer 31 located on negative electrode collector 36 and containing solid electrolyte 34 and first negative electrode active material particles 33, and second negative electrode mixture layer 32 located on first negative electrode mixture layer 31 and containing solid electrolyte 37 and second negative electrode active material particles 35. Further, negative electrode active material mixture layer 30 has boundary 30A in which first negative electrode active material particles 33 and second negative electrode active material particles 35 are in contact with each other in a discontinuous state at least in part in the cross-sectional view of negative electrode 60. Negative electrode collector 36 is an example of collector 5, and negative electrode active material mixture layer 30 is an example of active material mixture layer 11. Further, first negative electrode mixture layer 31 containing solid electrolyte 34 and first negative electrode active material particles 33 is an example of first mixture layer 12 containing first particles 3 and first active material particles 1, and second negative electrode mixture layer 32 containing solid electrolyte 37 and second negative electrode active material particles 35 is an example of second mixture layer 13 containing second particles 6 and second active material particles 4. In the following description of negative electrode 60, items common to electrode 10 and positive electrode 50 will be omitted or simplified.

As negative electrode collector 36, the same material as that described in positive electrode collector 27 described above can be used. As negative electrode collector 36, the same material as positive electrode collector 27 may be used, or a different material may be used.

First negative electrode active material particles 33 and second negative electrode active material particles 35 may be substances in which lithium is inserted or removed from the crystal structure at a potential lower than that of first positive electrode active material particles 23 and second positive electrode active material particles 26, and oxidation or reduction is performed accordingly.

Examples of first negative electrode active material particle 33 and second negative electrode active material particle 35 include an easily alloyed metal with lithium such as lithium, indium, tin and silicon, a carbon material such as hard carbon and graphite, and oxide active materials such as $Li_4Ti_5O_{12}$ and $SiO_x$. As first negative electrode active material particles 33 and second negative electrode active material particles 35, one type of negative electrode active material may be used alone, or two or more types of active material particles may be used in combination. Further, the same material may be used as first negative electrode active material particles 33 and second negative electrode active material particles 35, or different materials may be used.

The ratio of first negative electrode active material particles 33 to solid electrolyte 34 and the ratio of second negative electrode active material particles 35 to solid electrolyte 37 contained in negative electrode active material mixture layer 30 are, for example, each within a range of 0.66 or more and 19 or less when negative electrode active material/solid electrolyte=weight ratio in terms of weight, and may be within a range of 1 or more and 5.67 or less. When the weight ratio is in this range, both the lithium-ion conduction path and the electron conduction path in negative electrode active material mixture layer 30 can be secured. The weight ratios of first negative electrode mixture layer 31 and second negative electrode mixture layer 32 may be different from each other.

As illustrated in FIG. 4, first negative electrode active material particles 33 contain, for example, deformed negative electrode active material particles 33A having flat surface 33C facing second negative electrode mixture layer 32 at boundary 30A, and non-deformed negative electrode active material particles 33B having no flat surface 33C.

As solid electrolyte 34 and solid electrolyte 37, the same ones as described in the above-mentioned solid electrolyte 25 and solid electrolyte 28 can be used. The same substance may be used as solid electrolyte 25, solid electrolyte 28, solid electrolyte 34, and solid electrolyte 37, or different substances may be used for at least one of solid electrolyte 25, solid electrolyte 28, solid electrolyte 34, and solid electrolyte 37.

Negative electrode active material mixture layer 30 may contain a binder. As the type of the binder, the same binder that can be contained in the above-mentioned positive electrode active material mixture layer 20 can be used.

Negative electrode active material mixture layer 30 may contain a conductive auxiliary agent. As for the type of the conductive auxiliary agent, the same conductive auxiliary agent that can be contained in the above-mentioned positive electrode active material mixture layer 20 can be used. As a result, electron conductivity in negative electrode active material mixture layer 30 can be increased, and therefore the electron conduction path in negative electrode active material mixture layer 30 can be secured, and the internal resistance of all-solid-state battery 100 can be reduced. Therefore, the amount of current that can be conducted through the electron conduction path increases, and the charging/discharging characteristics of all-solid-state battery 100 are improved.

Solid electrolyte layer 40 contains solid electrolyte 41 having metal ion conductivity such as lithium-ions. As solid electrolyte 41, the same ones as described in the above-mentioned solid electrolyte 25 and solid electrolyte 28 can be used. As solid electrolyte 41, the same substance as solid electrolyte 25, solid electrolyte 28, solid electrolyte 34, or solid electrolyte 37 may be used, and a substance different from any of solid electrolyte 25, solid electrolyte 28, solid electrolyte 34, and solid electrolyte 37 may be used.

Solid electrolyte layer 40 may contain a binder in order to increase the adhesion strength between solid electrolytes 41. As the binder, the same binder as that which can be contained in the above-mentioned positive electrode active material mixture layer 20 can be used. When solid electrolyte layer 40 contains a binder, for example, the content of the binder in solid electrolyte layer 40 is 1% by weight or less of solid electrolyte 41. Solid electrolyte layer 40 may not contain a binder. When the content of the binder in solid electrolyte layer 40 is 1% by weight or less of that of solid electrolyte 41, the lithium-ion conduction in solid electrolyte layer 40 is less likely to be hindered, and the charging/discharging characteristics of all-solid-state battery 100 are less likely to deteriorate. The fact that the binder is not contained means that the binder is substantially not contained and the content of the binder in solid electrolyte layer 40 is 100 ppm or less of that of solid electrolyte 41. When solid electrolyte layer 40 does not contain a binder, solid electrolyte 41 is used as an adhesive. Solid electrolytes 41 are bonded to each other by sintering solid electrolytes 41.

Although not illustrated in all-solid-state battery 100 according to the present exemplary embodiment, for example, a terminal (metal positive electrode lead) is attached to the surface of positive electrode collector 27 opposite to positive electrode active material mixture layer 20 by welding or the like, and a terminal (metal negative electrode lead) is attached to the surface of negative electrode collector 36 opposite to negative electrode active material mixture layer 30 by welding or the like. All-solid-state battery 100 thus obtained or a group of batteries to which a plurality of all-solid-state batteries 100 are connected may be housed in a battery case, the positive electrode lead and the negative electrode lead may be led out to the outside of the battery case to seal the battery case.

As the battery case, for example, a bag made of an aluminum laminated film or the like, or a case made of metal (for example, SUS, iron, aluminum, etc.) or resin of any shape is used.

Manufacturing Method

Next, a method for manufacturing an electrode according to the present exemplary embodiment will be described.

A method for manufacturing electrode 10 according to the present exemplary embodiment includes forming a first mixture coating film from a first mixture of first particles 3 and first active material particles 1 on collector 5, forming flat surface 1C by deforming a surface of a part of first active material particles 1 on a surface portion of the first mixture coating film by pressurizing the first mixture coating film, and forming a second mixture coating film from a second mixture of second particles 6 and second active material particles 4 on the pressurized first mixture coating film. The formed first mixture coating film is pressurized to form first mixture layer 12, and the second mixture coating film is formed on the pressurized first mixture coating film to form second mixture layer 13. As a result, electrode 10 in which active material mixture layer 11 is stacked on collector 5 can be obtained. By such a manufacturing method, electrode 10 including first mixture layer 12 containing first active material particles 1 containing deformed particles 1A having flat surface 1C facing second mixture layer 13 at boundary 11A can be manufactured.

Further, the method for manufacturing electrode 10 further includes, for example, preparing the first mixture by mixing first active material particles 1 and first particles 3 so that first particles 3 adhere to 80% or more of the surface of first active material particles 1. Further, for example, the average particle diameter ($D_{50}$) of first particles 3 is 50% or less with respect to the average particle diameter ($D_{50}$) of first active material particles 1. The pressurized load of the first mixture coating film is, for example, within a range of 100% or more and 300% or less of the one-particle compressive strength of first active material particles 1.

Figure 5:
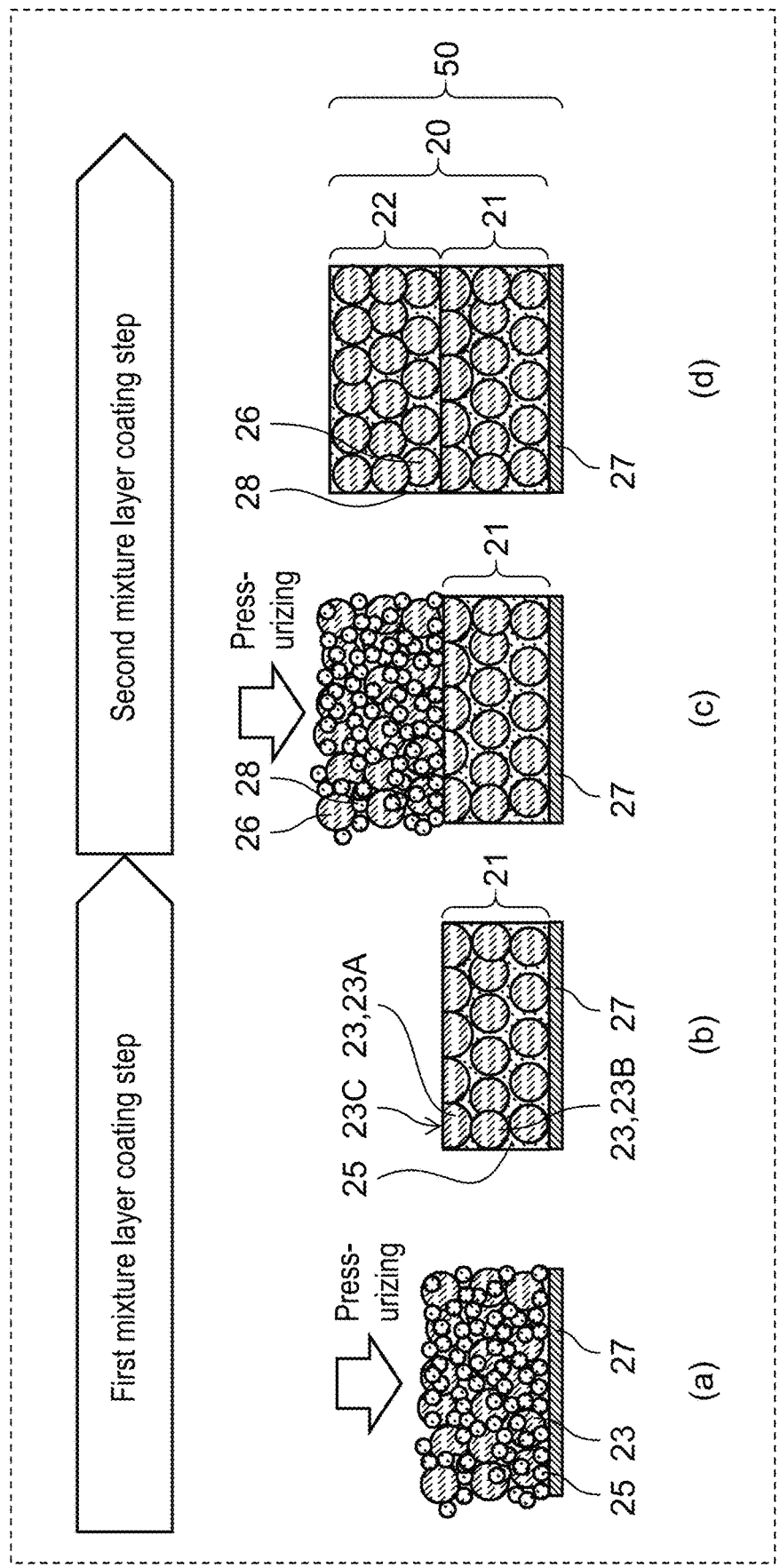
FIG. 5 is a view illustrating a method for manufacturing the positive electrode according to the exemplary embodiment.

Hereinafter, a manufacturing method in the case where electrode 10 is positive electrode 50 for an all-solid-state battery will be described with reference to FIG. 5. FIG. 5 is a view illustrating a method for manufacturing positive electrode 50 according to the present exemplary embodiment. FIG. 5 illustrates a schematic cross-sectional view of positive electrode 50 at each manufacturing stage. As illustrated in FIG. 5, the method for manufacturing positive electrode 50 includes, for example, a first mixture layer coating step and a second mixture layer coating step.

The first mixture layer coating step includes a step of forming a first positive electrode mixture coating film from a first mixture of solid electrolyte 25 and first positive electrode active material particles 23 on positive electrode collector 27, and a step of forming flat surface 23C by deforming a part of the surface of first positive electrode active material particles 23 on the surface portion of the first positive electrode mixture coating film by pressurizing the first positive electrode mixture coating film. In other words, the first mixture layer coating step includes a step of forming a first positive electrode mixture coating film containing solid electrolyte 25 and first positive electrode active material particles 23 on positive electrode collector 27, and a step of forming deformed positive electrode active material particles 23A having flat surface 23C by pressurizing the first positive electrode mixture coating film and deforming the surface of a part of first positive electrode active material particles 23 on the surface portion of the first positive electrode mixture coating film.

The second mixture layer coating step includes a step of forming the second positive electrode mixture coating film from the second mixture of solid electrolyte 28 and second positive electrode active material particles 26 on the pressurized first positive electrode mixture coating film. In other words, the second mixture layer coating step includes a step of forming the second positive electrode mixture coating film containing solid electrolyte 28 and second positive electrode active material particles 26 on the pressurized first positive electrode mixture coating film.

The first positive electrode mixture coating film is an example of the first mixture coating film, and the second positive electrode mixture coating film is an example of the second mixture coating film. The details of each step will be described below.

First, in the first mixture layer coating step, a positive electrode mixture is prepared as the first mixture by mixing desired solid electrolyte 25, first positive electrode active material particles 23, and other components such as a binder and a conductive auxiliary agent, if necessary. The specific form of each component blended in the positive electrode mixture is as described for positive electrode 50 described above.

In the present exemplary embodiment, for example, first positive electrode active material particles 23 and solid electrolyte 25 are mixed while applying an appropriate shearing force and pressure so that solid electrolyte 25 adheres to 80% or more of the surface of first positive electrode active material particles 23 to prepare a uniformly dispersed positive electrode mixture. The mixing method of first positive electrode active material particles 23 and solid electrolyte 25 is not particularly limited, and a general method can be used.

Further, in the present exemplary embodiment, for example, the average particle diameter of solid electrolyte 25 is 50% or less with respect to the average particle diameter of first positive electrode active material particles 23. As a result, solid electrolyte 25 can be uniformly adhered to the surface of first positive electrode active material particles 23.

Next, as illustrated in (a) of FIG. 5, the adjusted positive electrode mixture is applied onto positive electrode collector 27 to form the first positive electrode mixture coating film. The method for applying the positive electrode mixture is not particularly limited, but the powder positive electrode mixture can be applied by using a vibration feeder, a table feeder, a screw feeder, or the like. The first positive electrode mixture coating film may be formed by applying a slurry in which the positive electrode mixture is dispersed in a solvent or the like on positive electrode collector 27 and removing the solvent by heating or the like.

Next, as illustrated in (b) of FIG. 5, first positive electrode mixture layer 21 is formed by pressurizing the first positive electrode mixture coating film coated on positive electrode collector 27. In the present exemplary embodiment, for example, by pressurizing the first positive electrode mixture coating film with a pressurized load in a range of 100% or more and 300% or less of the one-particle compressive strength of first positive electrode active material particle 23, a part of the surface of first positive electrode active material particles 23 on the surface portion of the first positive electrode mixture coating film is deformed to form deformed positive electrode active material particles 23A having flat surface 23C. By pressurizing with a load pressure within the above range, deformed positive electrode active material particles 23A can be satisfactorily formed, and cracking of first positive electrode active material particles 23 can be suppressed. As a result, it is possible to deform first positive electrode active material particles 23 to form deformed positive electrode active material particles 23A while suppressing cracking of first positive electrode active material particles 23, and further it is possible to prevent non-deformed positive electrode active material particles 23B from being cracked, thereby suppressing the deterioration of the electrode performance. Further, by pressurizing the first positive electrode mixture coating film, the gap between first positive electrode active material particles 23 and solid electrolyte 25 is filled, and first positive electrode mixture layer 21 having a high filling rate can be obtained. The method of pressurizing the first positive electrode mixture coating film is not particularly limited, and a pressurizing method using a press or the like can be used.

By deforming a part of the surface of first positive electrode active material particles 23 on the surface portion of the first positive electrode mixture coating film to form flat surface 23C, when the second positive electrode mixture coating film is applied in the second mixture layer coating step, the particles in the second positive electrode mixture coating film can easily flow on the flat surface of the surface of first positive electrode mixture layer 21, and uniform second positive electrode mixture layer 22 can be formed. Further, flat surface 23C and second positive electrode active material particles 26 are likely to be in contact with each other.

Next, in the second mixture layer coating step, a positive electrode mixture is prepared as the second mixture by mixing desired solid electrolyte 28, second positive electrode active material particles 26, and other components such as a binder and a conductive auxiliary agent, if necessary. The specific form of each component blended in the positive electrode mixture is as described for positive electrode 50 described above. As the second mixture, the same positive electrode mixture as the first mixture may be used, or a different positive electrode mixture may be used.

Next, as illustrated in (c) of FIG. 5, the adjusted positive electrode mixture is applied onto the pressurized first positive electrode mixture coating film to form the second positive electrode mixture coating film. Also in the step of coating the second positive electrode mixture coating film, the method for applying the positive electrode mixture is not particularly limited, and the same method as the method for applying the first positive electrode mixture coating film can be used.

Next, as illustrated in (d) of FIG. 5, the second positive electrode mixture coating film is applied, and then the second positive electrode mixture coating film is pressurized to form second positive electrode mixture layer 22, and positive electrode 50 in which positive electrode active material mixture layer 20 is formed on collector 27 can be manufactured. The pressurized load of the second positive electrode mixture coating film may be set to a pressure such that second positive electrode mixture layer 22 having a desired filling rate is formed, for example, may be equal to or greater than the pressurized load of the first positive electrode mixture coating film, or may be equal to or less than the pressurized load of the first positive electrode mixture coating film.

When negative electrode 60 is manufactured as electrode 10, in the method for manufacturing positive electrode 50 described above, negative electrode 60 can be manufactured by using first negative electrode active material particles 33 and solid electrolyte 34 instead of first positive electrode active material particles 23 and solid electrolyte 25 and using second negative electrode active material particles 35 and solid electrolyte 37 instead of second positive electrode active material particles 26 and solid electrolyte 28.

EXAMPLES

Examples of the present exemplary embodiment will be described below. The examples illustrated below are examples, and the exemplary embodiments of the present disclosure are not limited to these examples.

First, Li-containing Ni, Mn, Co composite oxides (average particle diameter: within a range of 4 µm or more and 5 µm or less, compressive strength: 106 MPa) as first positive electrode active material particles 23 and second positive electrode active material particles 26 and calcium carbonate (average particle diameter: within a range of 0.7 µm or more and 1 µm or less) as simulated particles of solid electrolyte 25 and solid electrolyte 28 were mixed in a mortar with a component ratio of positive electrode active material particles/calcium carbonate=15/85 in terms of weight to prepare a positive electrode mixture as the first mixture and the second mixture.

Next, an aluminum foil (thickness: 20 µm) was prepared as positive electrode collector 27. The positive electrode mixture prepared above was applied onto the aluminum foil by using a mold having a φ10 mm, and then pressurized at 289 MPa to form first positive electrode mixture layer 21.

The positive electrode mixture prepared above is applied onto first positive electrode mixture layer 21 by using a mold having φ10 mm and then pressurized to form second positive electrode mixture layer 22 and complete positive electrode 50.

Figure 6:
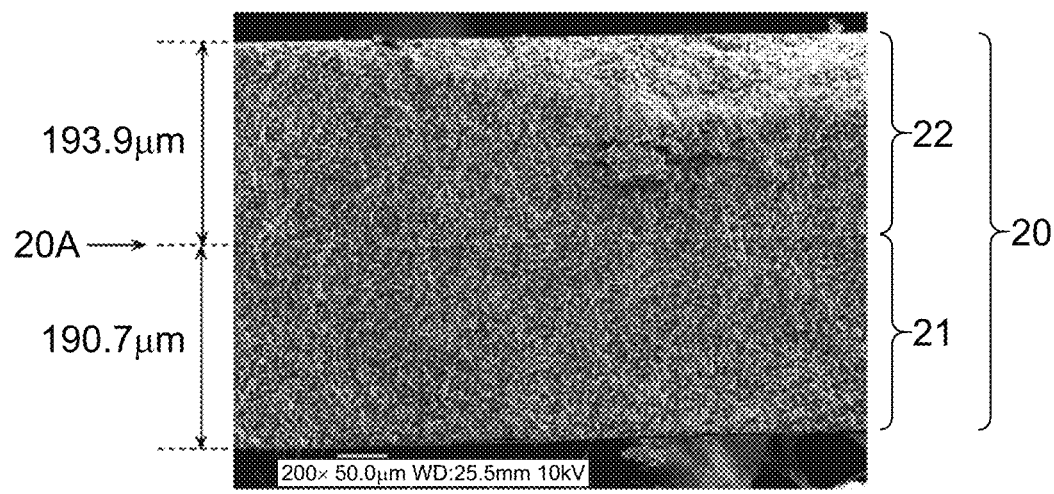
FIG. 6 is a cross-sectional SEM image of the positive electrode active material mixture layer in examples.

FIG. 6 is a cross-sectional SEM image of positive electrode active material mixture layer 20 in the examples. As illustrated in FIG. 6, it can be seen that positive electrode active material mixture layer 20 has boundary 20A between first positive electrode mixture layer 21 and second positive electrode mixture layer 22. The thickness of first positive electrode mixture layer 21 was 190.7 µm. The thickness of second positive electrode mixture layer 22 was 193.9 µm.

Figure 7:
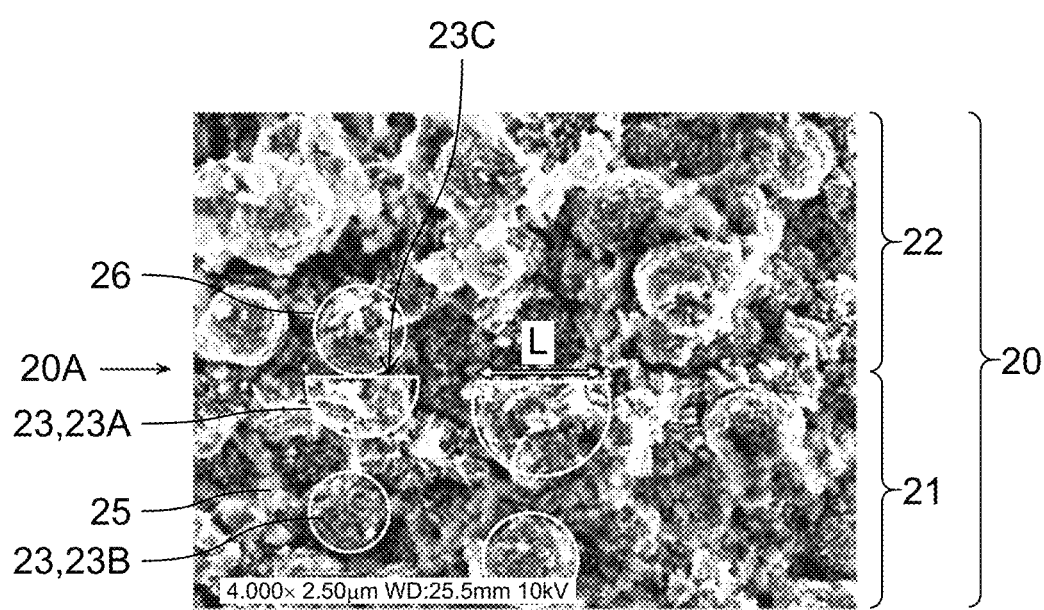
FIG. 7 is a cross-sectional SEM image of the vicinity of the boundary between the first positive electrode mixture layer and the second positive electrode mixture layer in the examples.

FIG. 7 is a cross-sectional SEM image of the vicinity of boundary 20A between first positive electrode mixture layer 21 and second positive electrode mixture layer 22 in the examples. As illustrated in FIG. 7, it can be seen that the portion of first positive electrode active material particle 23 in contact with boundary 20A between first positive electrode mixture layer 21 and second positive electrode mixture layer 22 facing second positive electrode mixture layer 22 is crushed by pressurization to form deformed positive electrode active material particles 23A having flat surface 23C. Further, at boundary 20A, it can be seen that deformed positive electrode active material particles 23A contain particles in which flat surface 23C of deformed positive electrode active material particles 23A is in contact with second positive electrode active material particles 26. Further, deformed positive electrode active material particles 23A contain particles having angle A of 90° or more between the outer circumference of deformed positive electrode active material particles 23A and flat surface 23C of deformed positive electrode active material particles 23A. Further, deformed positive electrode active material particles 23A also contain particles having an R shape of which a surface in contact with boundary 20A is 10 times or more average particle diameter D of non-deformed positive electrode active material particles 23B.

Figure 8:
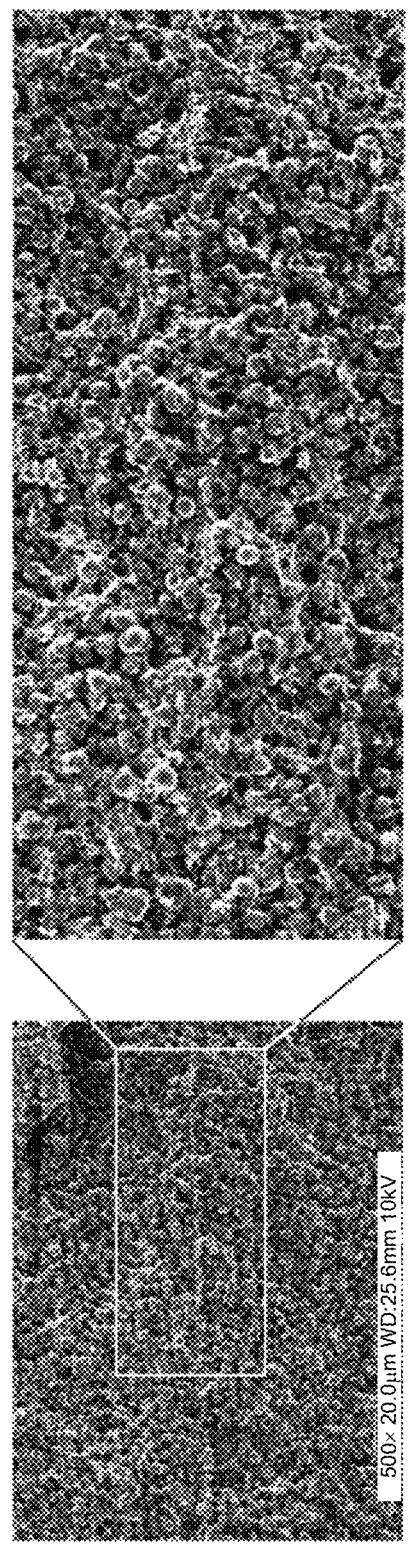
FIG. 8 is an enlarged cross-sectional SEM image of a positive electrode active material mixture layer in the examples.

FIG. 8 is an enlarged cross-sectional SEM image of positive electrode active material mixture layer 20 in the examples. In FIG. 8, the vicinity of boundary 20A between first positive electrode mixture layer 21 and second positive electrode mixture layer 22 in the cross section of positive electrode active material mixture layer 20 is enlarged. Further, the data measured from the cross-sectional SEM image of positive electrode active material mixture layer 20 in the examples are illustrated in Table 1 of FIG. 9.

As illustrated in Table 1, average particle diameter D of non-deformed positive electrode active material particles 23B contained in first positive electrode mixture layer 21 (that is, the average value of particle diameter D of non-deformed positive electrode active material particles 23B in Table 1) was 4.03 µm, and the maximum value of length L of the flat surface of non-deformed positive electrode active material particles 23B was 5.98 µm. Therefore, there are deformed positive electrode active material particles 23A in which length L of the flat surface in the cross-sectional view is equal to or larger than average particle diameter D of non-deformed positive electrode active material particles 23B. Further, the ratio of total length L of the flat surface of deformed positive electrode active material particles 23A to length B of the boundary with second positive electrode mixture layer 22, that is, the ratio of flat surfaces ΣL/B was 82.3% in Table 1 above. Further, average inter-particle distance d between adjacent deformed positive electrode active material particles 23A (that is, the average value of distances d between deformed positive electrode active material particles 23A in Table 1) was 114.2% of average particle diameter D of non-deformed positive electrode active material particles 23B.

The electrodes and batteries according to the present disclosure have been described above based on the exemplary embodiments and examples, but the present disclosure is not limited to these exemplary embodiment and examples. As long as the gist of the present disclosure is not deviated, various modifications that can be conceived by those skilled in the art are applied to the exemplary embodiment and examples, and other exemplary embodiments constructed by combining some components of the exemplary embodiment and examples are also included in the scope of the present disclosure.

The electrodes and batteries using the electrodes according to the present disclosure are expected to be applied to batteries for portable electronic devices and wearable electronic devices, batteries for vehicles, and the like.

What is claimed is:

1. An electrode comprising:
a collector; and
an active material mixture layer that has
a first mixture layer located on the collector and containing first particles and first active material particles, and
a second mixture layer located on the first mixture layer and containing second particles and second active material particles,
wherein the active material mixture layer has a boundary between the first mixture layer and the second mixture layer at which the first active material particles and the second active material particles are in contact with each other in a discontinuous state at least in part, in a cross-sectional view of the electrode, and
wherein the first active material particles contain deformed particles each having a flat surface facing the second mixture layer at the boundary, and
non-deformed particles having no flat surface;
wherein the second active material particles do not contain the deformed particles having the flat surfaces.

2. The electrode of claim 1,
wherein the flat surfaces of the deformed particles are in contact with the second active material particles at the boundary.

3. The electrode of claim 1,
wherein the deformed particles contain particles having a length of the flat surface that is equal to or larger than an average particle diameter of the non-deformed particles in the cross-sectional view of the electrode.

4. The electrode of claim 1,
wherein the deformed particles contain particles each having an angle of 90° or more between an outer circumference and the flat surface in the cross-sectional view of the electrode.

5. The electrode of claim 1,
wherein a maximum height Rz of the flat surfaces of the deformed particles is 10 µm or less in the cross-sectional view of the electrode.

6. The electrode of claim 1,
wherein a ratio of a total length of the flat surfaces to a length of the boundary at the boundary is 80% or more in the cross-sectional view of the electrode.

7. The electrode of claim 1,
wherein an average inter-particle distance between the deformed particles at the boundary is 130% or less of an average particle diameter of the non-deformed particles.

8. The electrode of claim 1,
wherein an average particle diameter of the first particles is 50% or less with respect to an average particle diameter of the non-deformed particles.

9. The electrode of claim 1,
wherein the first particles are adhered to 80% or more of a surface of each of the first active material particles in the cross-sectional view of the electrode.

10. The electrode of claim 1,
wherein a thickness of the first mixture layer is within a range of 20 µm or more and 200 µm or less.

11. The electrode of claim 1,
wherein the first particles and the second particles are solid electrolytes.

12. A battery comprising:
a positive electrode;
a negative electrode; and
an electrolyte layer located between the positive electrode and the negative electrode,
wherein at least one of the positive electrode and the negative electrode is the electrode of claim 1.

13. An electrode comprising:
a collector; and
an active material mixture layer that has
a first mixture layer located on the collector and containing first particles and first active material particles, and
a second mixture layer located on the first mixture layer and containing second particles and second active material particles,
wherein the active material mixture layer has a boundary between the first mixture layer and the second mixture layer at which the first active material particles and the second active material particles are in contact with each other in a discontinuous state at least in part, in a cross-sectional view of the electrode, and wherein the first active material particles contain
deformed particles each having a flat surface facing the
   second mixture layer at the boundary,
non-deformed particles having no flat surface, and
wherein the deformed particles are contained only in the
   first mixture layer.

* * * * *